(12) United States Patent
Abali et al.

(10) Patent No.: US 12,254,178 B2
(45) Date of Patent: Mar. 18, 2025

(54) TECHNIQUE TO HANDLE INSUFFICIENT ON-CHIP MEMORY CAPACITY IN DECOMPRESSORS

(71) Applicant: International Business Machines Corporation, Armonk, NY (US)

(72) Inventors: Bulent Abali, Tenafly, NJ (US); Matthias Klein, Poughkeepsie, NY (US); Ashutosh Mishra, Lagrangeville, NY (US); Girish Gopala Kurup, Jagadishnagar (IN)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 18/217,480

(22) Filed: Jun. 30, 2023

(65) Prior Publication Data

US 2025/0004638 A1      Jan. 2, 2025

(51) Int. Cl.
*G06F 3/06*      (2006.01)
(52) U.S. Cl.
CPC .......... *G06F 3/0604* (2013.01); *G06F 3/0656* (2013.01); *G06F 3/0673* (2013.01)
(58) Field of Classification Search
CPC .... G06F 3/0604; G06F 3/0656; G06F 3/0673; H03M 7/3086
See application file for complete search history.

(56) References Cited

U.S. PATENT DOCUMENTS

| | | | |
|---|---|---|---|
| 10,169,073 B2 | 1/2019 | Drysdale et al. | |
| 10,489,159 B2 | 11/2019 | Vattakandy et al. | |
| 2010/0013678 A1* | 1/2010 | Biran | H03M 7/3086 341/55 |
| 2022/0069839 A1* | 3/2022 | Parker | H03M 7/3088 |
| 2023/0100586 A1* | 3/2023 | Kakaiya | G06F 9/3009 717/102 |

OTHER PUBLICATIONS

Yu, Hao, et al., "Stateful Hardware Decompression in Networking Environment," Proceedings of the 4th ACM/IEEE Symposium on Architectures for Networking and Communications Systems, pp. 141-150, Nov. 2008.

\* cited by examiner

*Primary Examiner* — Kalpit Parikh
(74) *Attorney, Agent, or Firm* — Monchai Chuaychoo

(57) ABSTRACT

A method to handle insufficient on-chip memory capacity in decompressors is disclosed. In one embodiment, such a method includes executing, by a decompressor configured to decompress data, an instruction configured to copy data from a source position within a data stream to a destination position within the data stream. The method determines whether the source position currently resides within an on-chip buffer of the decompressor. In the event the source position does not currently reside within the on-chip buffer of the decompressor, the method writes arbitrary placeholder data to the destination position and adds the instruction to a patch buffer. At a later point in time, the method retrieves the instruction from the patch buffer and executes the instruction by retrieving the data from the source position and overwriting the arbitrary placeholder data at the destination position with the data. A corresponding system and computer program product are also disclosed.

20 Claims, 8 Drawing Sheets

TECHNIQUE TO HANDLE INSUFFICIENT ON-CHIP MEMORY CAPACITY IN DECOMPRESSORS

BACKGROUND

Field of the Invention

This invention relates to decompressors and more particularly to techniques for handling insufficient on-chip memory capacity in decompressors.

Background of the Invention

A decompressor, also known as a decompression accelerator or decoder, performs the inverse operation of compression. It generally takes compressed data as input and reconstructs the original data by reversing the compression techniques applied during the compression process. The decompressor identifies the compression format or algorithm used and applies the necessary steps to restore the data to its original form.

To decompress data, a decompressor typically needs to store certain information in on-chip memory. This information may include intermediate decompressed blocks, metadata, and/or internal data structures required for efficient decompression. The specific memory requirements may vary depending on the compression/decompression algorithm that is used and the size of the compressed data. In some cases, the decompressor may also utilize on-chip buffers or caches to hold portions of the compressed data or intermediate decompressed data during the decompression process. These buffers may help optimize decompression speed and efficiency.

Unfortunately, in some cases and with some compression/decompression algorithms, a decompressor may not include enough on-chip memory to provide necessary buffers and/or efficiently execute the decompression algorithm. Thus, due to hardware or other limitations, some decompressors may be limited in the types of decompression algorithms they can effectively execute.

SUMMARY

The invention has been developed in response to the present state of the art and, in particular, in response to the problems and needs in the art that have not yet been fully solved by currently available systems and methods. Accordingly, systems and methods have been developed for handling insufficient on-chip memory capacity in decompressors. The features and advantages of the invention will become more fully apparent from the following description and appended claims, or may be learned by practice of the invention as set forth hereinafter.

Consistent with the foregoing, a method to handle insufficient on-chip memory capacity in decompressors is disclosed. In one embodiment, such a method includes executing, by a decompressor configured to decompress data, an instruction configured to copy data from a source position within a data stream to a destination position within the data stream. The method determines whether the source position currently resides within an on-chip buffer of the decompressor. In the event the source position does not currently reside within the on-chip buffer of the decompressor, the method writes arbitrary placeholder data to the destination position and adds the instruction to a patch buffer. At a later point in time, the method retrieves the instruction from the patch buffer and executes the instruction by retrieving the data from the source position and overwriting the arbitrary placeholder data at the destination position with the data.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
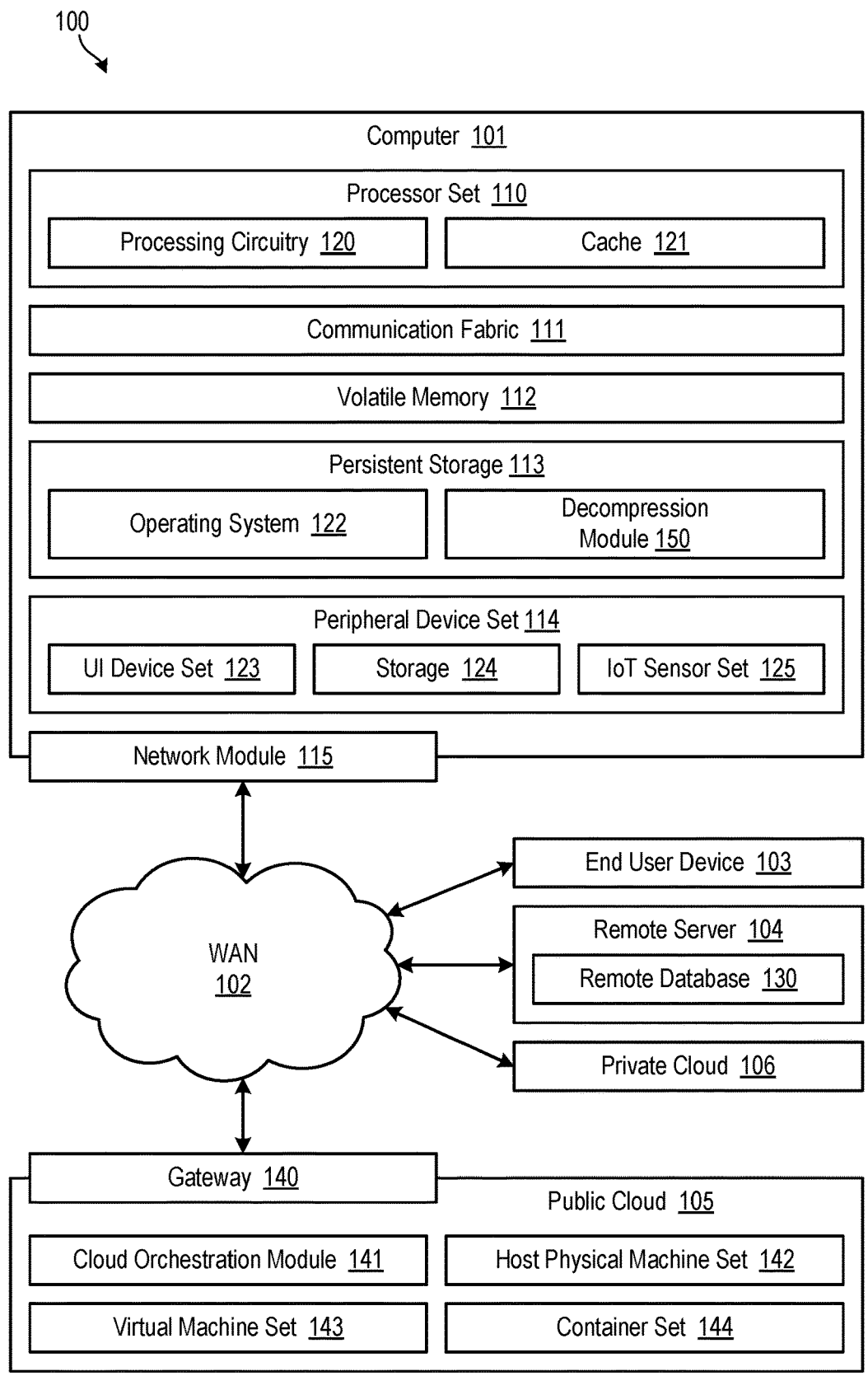
FIG. 1 is a high-level block diagram showing one example of a computing system for use in implementing embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code 150 for handling insufficient on-chip memory capacity in decompressors (i.e., collectively referred to herein as a "decompression module 150"). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
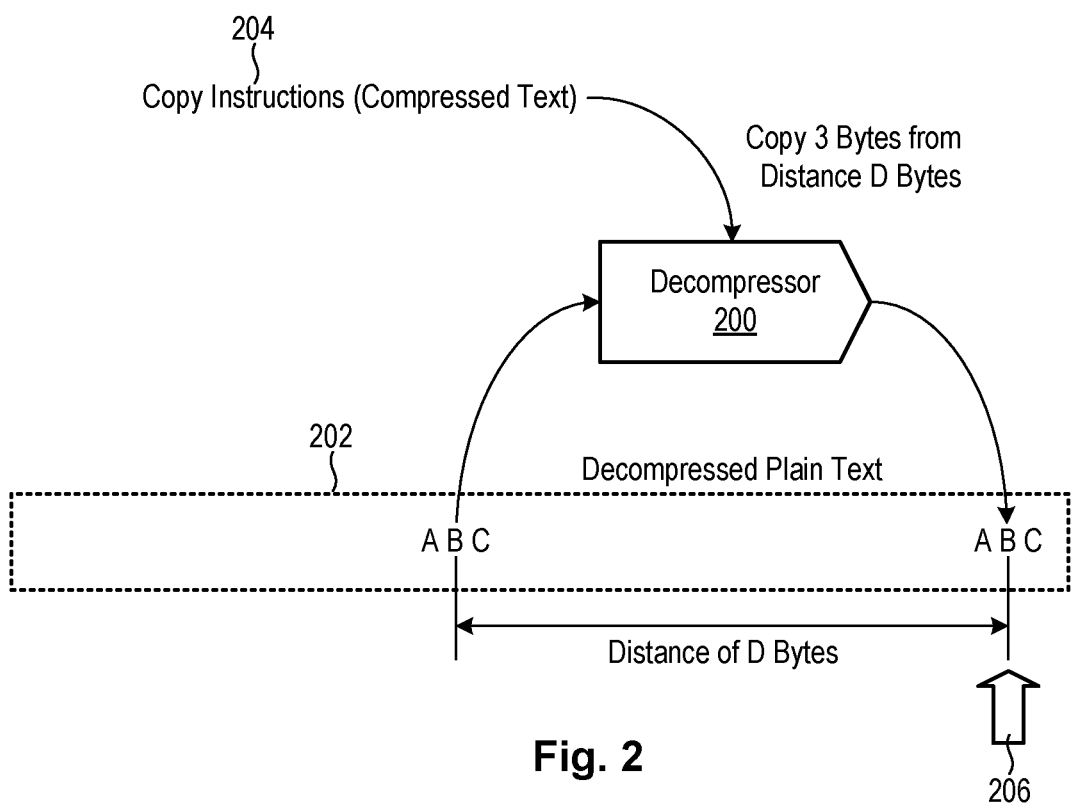
FIG. 2 is a high-level block diagram showing one example of a decompression algorithm that utilizes a sliding window.

Referring to FIG. 2, as previously mentioned, a decompressor, also known as a decompression accelerator or decoder, performs the inverse operation of compression. It generally takes compressed data as input and reconstructs the original data by reversing the compression techniques applied during the compression process. The decompressor identifies the compression format or algorithm used and applies the necessary steps to restore the data to its original form.

To decompress data, a decompressor typically needs to store certain information in on-chip memory. This information may include intermediate decompressed blocks, metadata, and/or internal data structures required for efficient decompression. The specific memory requirements may vary depending on the compression/decompression algorithm and the size of the compressed data. In some cases, the decompressor may also utilize on-chip buffers or caches to hold portions of the compressed data or intermediate decompressed data during the decompression process. These buffers may help optimize decompression speed and efficiency.

Unfortunately, in some cases and with some compression/decompression algorithms, a decompressor may not include enough on-chip memory to provide necessary buffers and/or efficiently execute the decompression algorithm. Thus, due to hardware or other limitations, some decompressors may be limited in the types of decompression algorithms they can effectively execute.

The memory size required for a decompressor typically depends on several factors, including the compression algorithm used, the size of the compressed data, and the desired performance of the decompression process. Some algorithms, such as Huffman coding, may require minimal memory as they operate on a symbol-by-symbol basis and do not require a significant amount of intermediate storage. Other algorithms, such as the LZ77 or the DEFLATE algorithm, may require a larger amount of memory to store a "history window" (also referred to herein as a "sliding window") or other data structures necessary for efficient decompression.

The "sliding window" may refer to a storage buffer or region of memory that retains a portion of previously processed data during the decompression process. The purpose of the sliding window is to enable the decompressor to refer back to the decompressed data stream history in order to identify repeated patterns or sequences. By recognizing and leveraging these patterns, the decompressor can more efficiently reconstruct the original uncompressed data.

FIG. 2 is a high-level block diagram showing one example of a decompression algorithm (e.g., a Lempel-Ziv or LZ decompression algorithm) that utilizes a sliding window 202. In this example, when implementing this decompression algorithm, the decompressor 200 may receive a stream of copy instructions 204 to copy a previous instance of a string (e.g., a specified number of bytes of data) in the decompressed output to a current output offset 206. In certain embodiments, this instruction may come in the form of a (distance, length) value pair indicating how far back the decompressor 200 needs to reach into the decompressed data stream as well as how many bytes to copy. Compression may be achieved since (distance, length) pairs may be shorter than the strings they reference. The decompressor 200 may convert the compressed data stream into the original uncompressed form by executing the copy instructions 204, namely by replacing each (distance, length) pair with the string copied at distance D relative to the current output offset 206.

Figure 3:
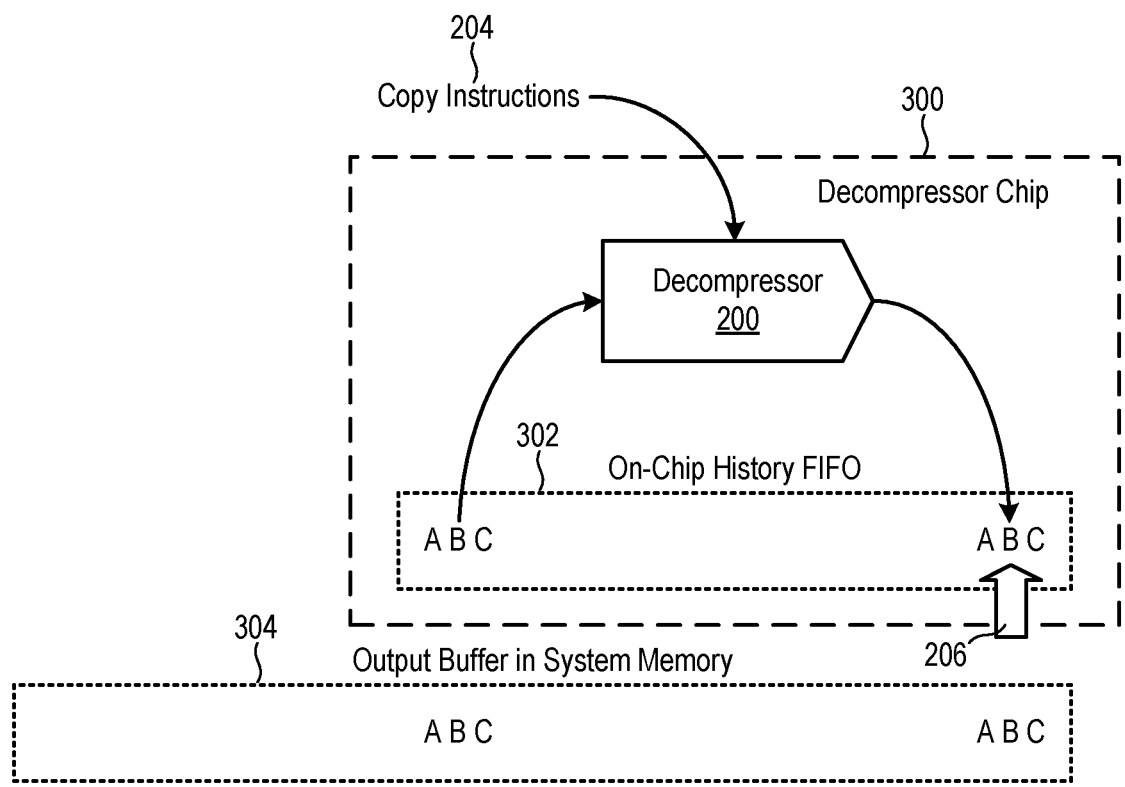
FIG. 3 is a high-level block diagram showing use of an on-chip history buffer to facilitate throughput.

Decompression algorithms often limit the maximum distance and maximum length possible. For example, the DEFLATE decompression algorithm format permits a maximum distance of 32768 bytes and a length of 258 bytes. Other decompression algorithms may permit distances on the order of gigabytes. The range of distance permitted by the decompression algorithm may define the size of the "sliding window" previously described. All or part of the sliding window 202 may be implemented by on-chip history buffer 302 or on-chip history FIFO 302 of the decompressor 200, as shown in FIG. 3. The on-chip history buffer 302 may be implemented in fast memory of the decompressor chip 300 (compared to slow system memory located outside of the decompressor chip 300) to enable high throughput decompression.

A larger sliding window 202 may increase the probability of finding duplicate strings, therefore providing better compression quality. Because high throughput decompressor hardware may use on-chip memory to implement all of part of the sliding window 202, the amount of memory that is available may limit how much of the sliding window 202 can implemented on the decompressor chip 300. A sliding window 202 of few tens to hundreds of kilobytes may be practically implemented on the decompressor chip 300 with current silicon technology. However, a sliding window 202 that is megabytes to gigabytes in size may not be cost effective or physically feasible for implementation on the decompressor chip 300.

FIG. 3 is a high-level block diagram showing use of an on-chip history buffer 302 to facilitate throughput when decompressing data (e.g., text). In general, the on-chip history buffer 302 contains an on-chip copy of the most recent decompressed data that is output to system memory 304. In the example shown in FIG. 3, the decompressor 200 receives a copy instruction 204 to copy data (e.g., a string of text) from a source position within the decompressed data stream to a destination position (i.e., the current output offset 206) within the data stream. In this example, the requested string happens to be located in the high-speed on-chip history buffer 302. Thus, the decompressor 200 is able to efficiently execute the copy instruction 204 by copying the data from the on-chip history buffer 302 and writing it to the head 206 of the on-chip history buffer 302 as well as the system memory output buffer 304.

Figure 4:
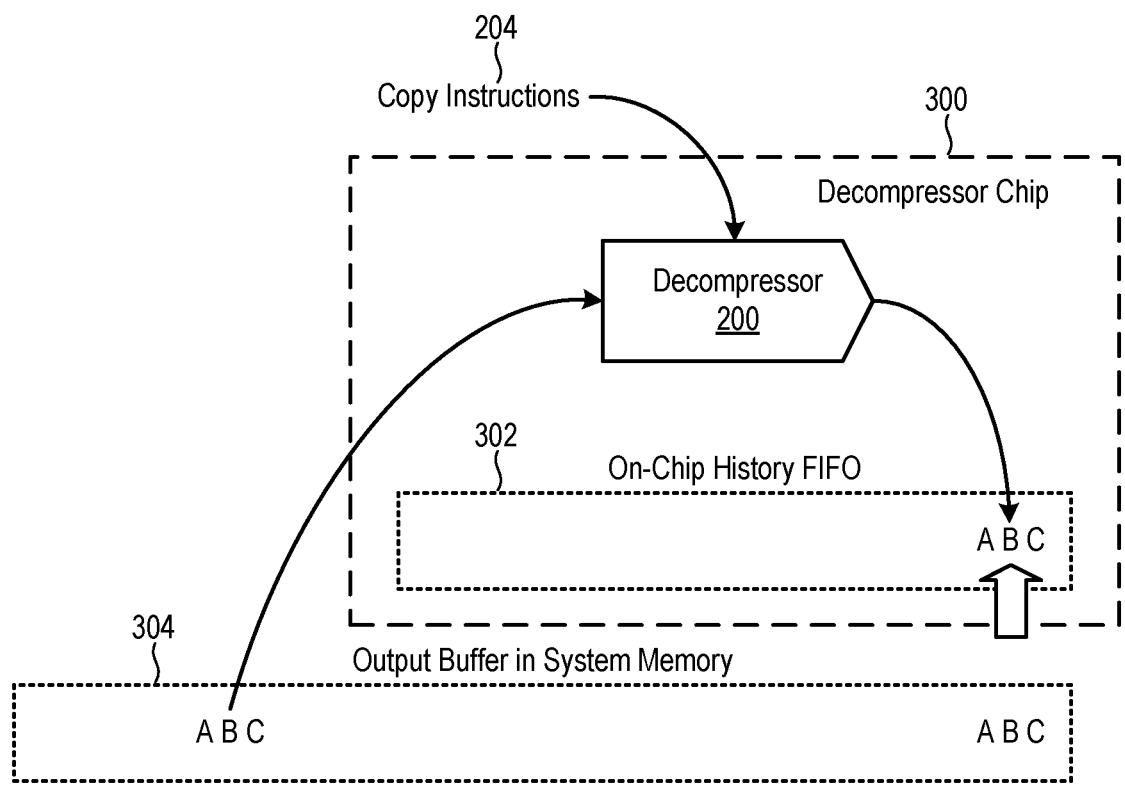
FIG. 4 is a high-level block diagram showing a scenario where requested data is not located within the on-chip history buffer.

FIG. 4 is a high-level block diagram showing a scenario where requested data is not located within the on-chip history buffer 302 (referred to herein as a "miss"). In the example shown in FIG. 4, the decompressor 200 receives a copy instruction 204 to copy data (e.g., a string of text) from a source position within the decompressed data stream to a destination position (i.e., the current output offset 206) within the data stream. However, in this example, the requested string is not located in the high-speed on-chip history buffer 302 due to it aging out. The requested string can only be retrieved from the system memory output buffer 304. This can present various challenges: First, the access latency of the system memory 304 is orders of magnitude higher than that of the on-chip history buffer 302. This will cause delays in reading the data, which will significantly reduce the performance of the decompressor 200. Second, accessing the system memory 304 conceptually changes the memory interface circuit from being a streaming-unit to a random-access-unit which significantly complicates the hardware design. Thus, the decompressor 200 is not able to efficiently execute the copy instruction 204 in the scenario shown in FIG. 4.

Figure 5:
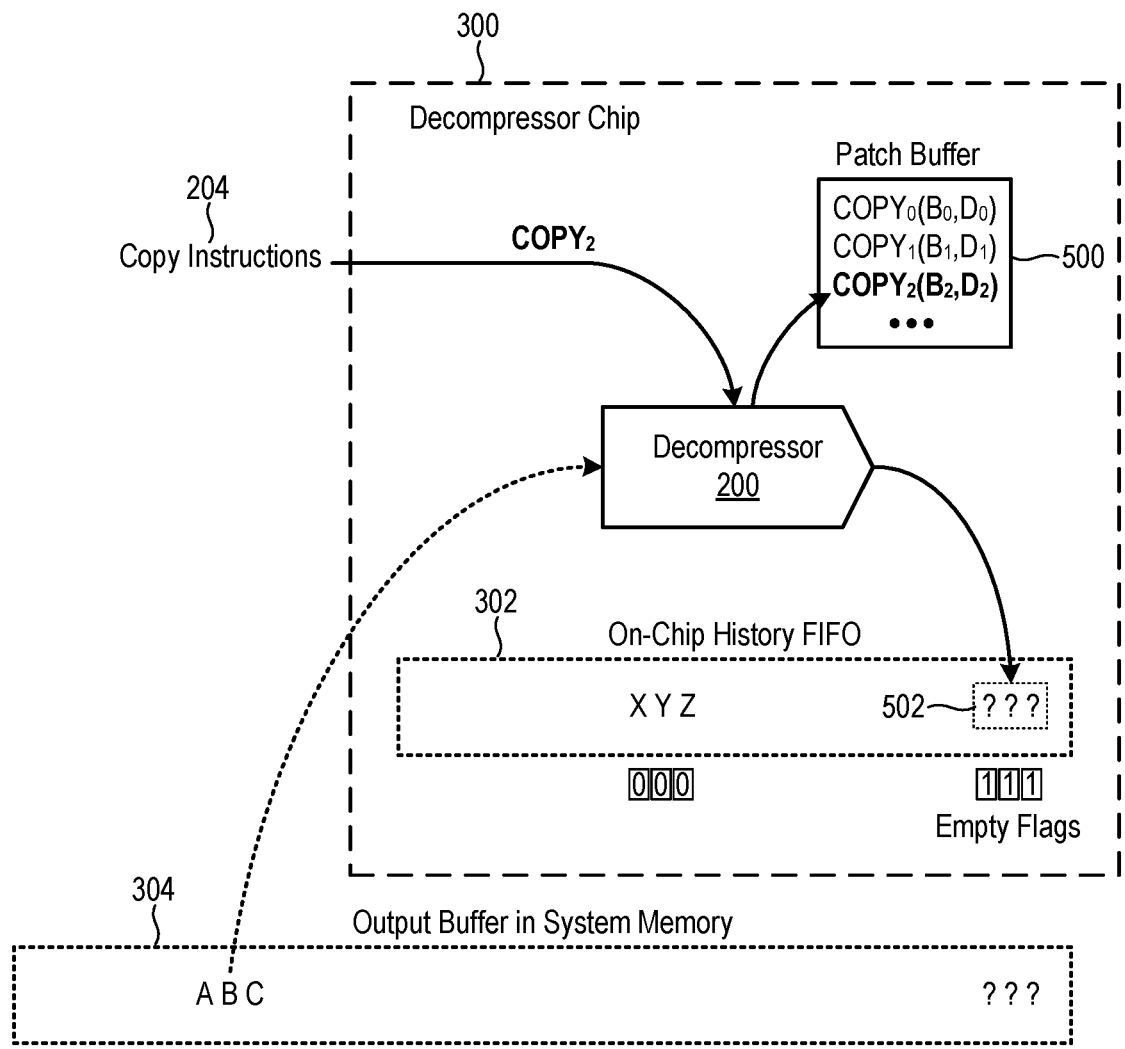
FIG. 5 is a high-level block diagram showing utilization of a patch buffer when requested data is not located within the on-chip history buffer.

Referring to FIG. 5, in order to mitigate the performance issues incurred by the scenario illustrated in FIG. 4, in certain embodiments in accordance with the invention, a decompressor 200 may be configured to perform various workarounds to compensate for insufficient on-chip memory capacity on the decompressor chip 300. For example, in certain embodiments, when a copy instruction 204 is received by the decompressor 200 that references a source position that is outside of the on-chip history buffer 302 (i.e., a "miss"), the decompressor 200 may record the copy instruction 204 in a patch buffer 500 as opposed to immediately processing the copy instruction 204. In certain embodiments, the patch buffer 500 is implemented/allocated in the same on-chip memory as the on-chip history buffer 302. The copy instructions 204 in the patch buffer 500 may then be executed at a later time as will be described in association with FIG. 6. This may allow the decompressor 200 to continue processing copy instructions 204 without incurring the latency of retrieving data from system memory 304.

When a copy instruction 204 is added to the patch buffer 500, the decompressor 200 may write arbitrary placeholder data to the destination position 502 where data was intended to be written (i.e., at the current output offset 206). In certain embodiments, this arbitrary placeholder data is all zeros but could also include other symbols to indicate that the destination position 500 contains invalid data. The size of the invalid data or "hole" 500 in the decompressed data stream may be known since it may be encoded in the copy instruction 204 that is saved in the patch buffer 500.

In certain embodiments, when a copy instruction 204 is saved in the patch buffer 500 and arbitrary placeholder data is written to the destination position 502, the decompressor 200 may set an "empty flag" for each data element that is written with arbitrary placeholder data. For example, a bit (i.e., an "empty flag") may be set for each byte of data in the output data stream that is written with arbitrary placeholder data. The "empty flags" may indicate that the associated data elements contain invalid data. The manner in which the "empty flags" are used will be described in association with FIG. 7.

Figure 6:
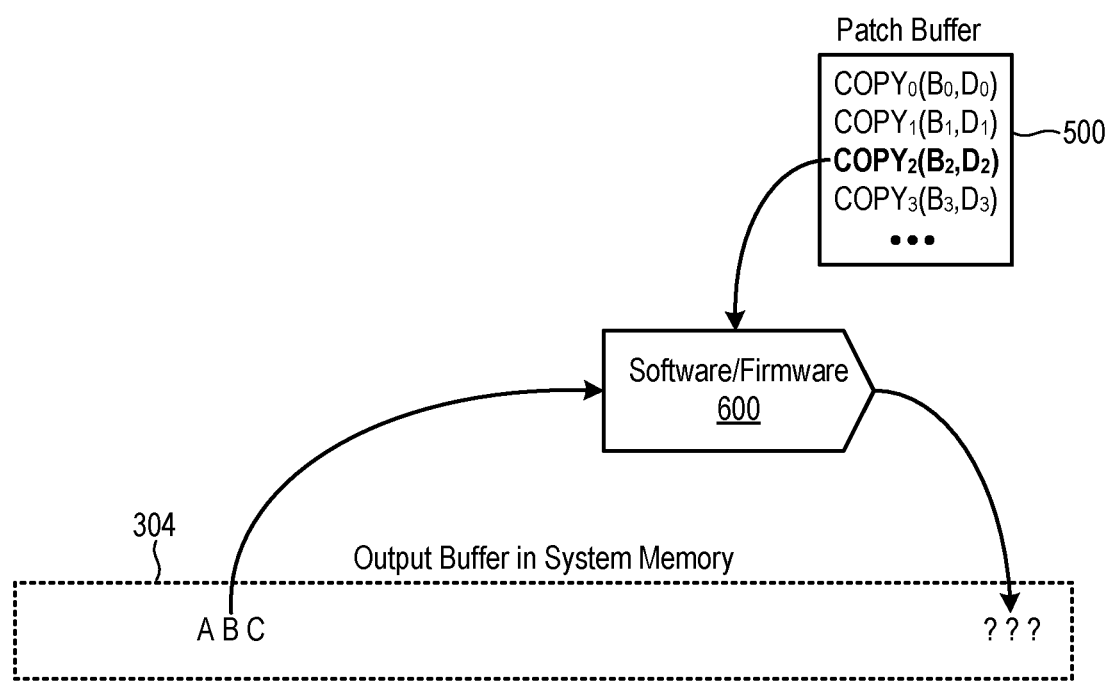
FIG. 6 is a high-level block diagram showing software/firmware that later retrieves and executes a copy instruction in the patch buffer.

Referring to FIG. 6, at some later point in time, software 600 or firmware 600 may patch the "holes" in the decompressed data stream in system memory 304. This software/firmware 600 may operate outside of the decompressor chip 300. In certain embodiments, this may be accomplished by delivering the list of copy instructions 204 from the patch buffer 500 to the software/firmware 600 for execution in the order the copy instructions 204 were added to the patch buffer 500. The software/firmware 600 may then proceed through the list by copying data (e.g., strings) from the source position in the decompressed data stream to the destination position using a function such as the memcpy ( ) function in Linux. The software/firmware 600 processing the list as a batch has the advantage of amortizing hardware-firmware communication latency over many copy instructions 204. This is more efficient than interrupting the software/firmware 600 each time a miss occurs in the on-chip history buffer 302.

In certain embodiments, the software/firmware 600 may be configured to operate in parallel with the decompressor 200. That is, the software/firmware 600 may work to patch "holes" in the decompressed data stream while the decompressor 200 is actively working to decompress data. In such an embodiment, when a "miss" occurs to the on-chip history buffer 302, the software/firmware 600 may be immediately signaled to patch the "hole" that was created by the miss and provided with any necessary information from the patch buffer 500 needed to do so. Using the approach, the patch buffer 500 may have a reduced size assuming the software/firmware 600 is able to keep up with the decompressor 200 in patching "holes" that are generated during the decompression process. The decompressor 200 may continue to operate in an efficient manner without waiting for the software/firmware 600 to patch any "holes."

Figure 7:
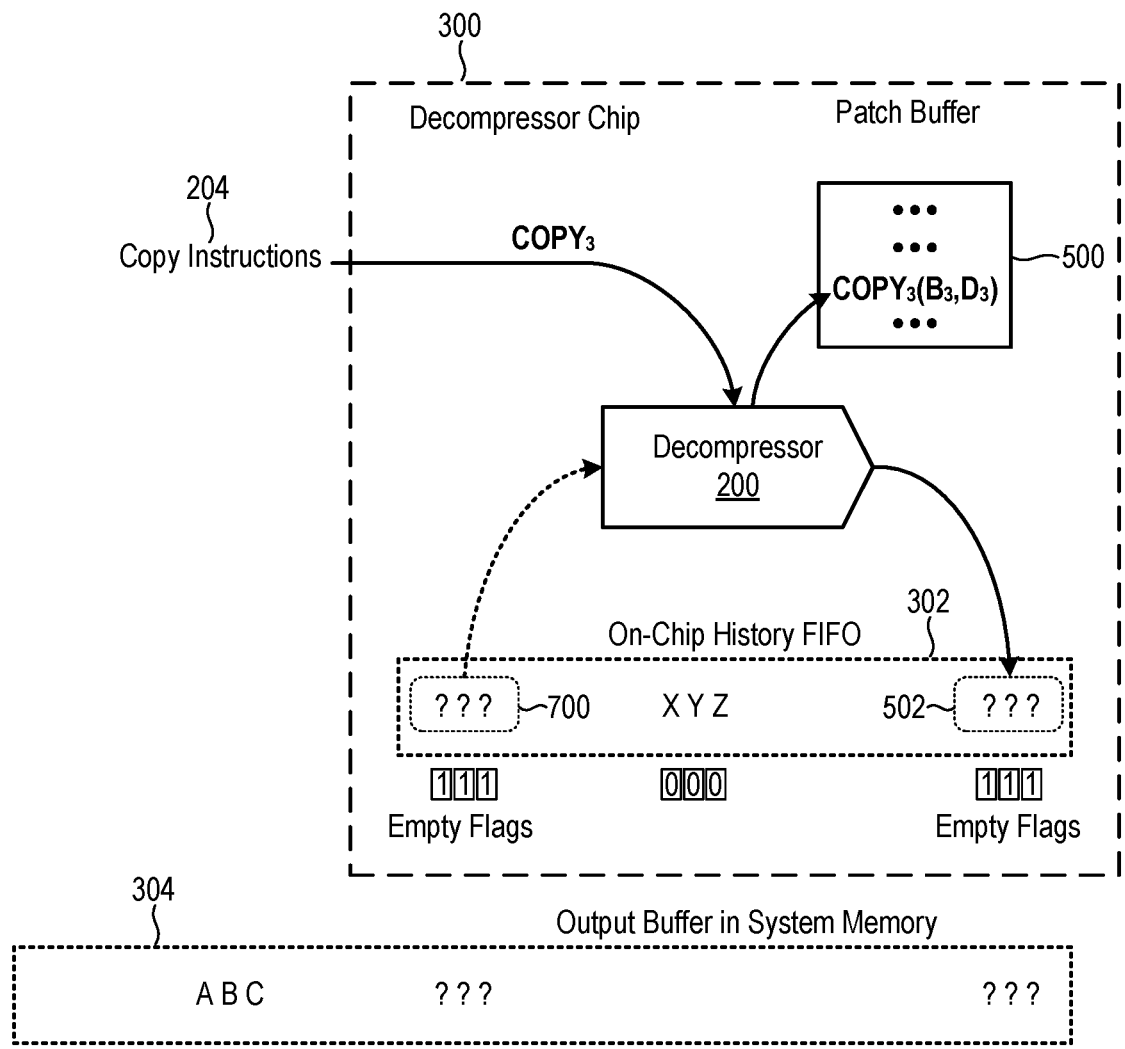
FIG. 7 is a high-level block diagram showing use of "empty flags" to indicate whether data elements in the on-chip history buffer contain valid data.

Referring to FIG. 7, as previously mentioned, when a "miss" occurs in the on-chip history buffer 302, the decompressor 200 may set an "empty flag" for each data element (e.g., byte) that is written with arbitrary placeholder data. However, a future copy instruction 204 may reference a source position in the on-chip history buffer 302 that contains the arbitrary placeholder data. This could result in the decompressor 200 inadvertently copying arbitrary placeholder data (which is not valid data) from the source position to the destination position.

To prevent this from occurring, when a copy instruction 204 is executed, the decompressor 200 may check the "empty flags" associated with the source position 700 to determine whether the source position contains valid data. If the "empty flags" indicate that the source position contains invalid data, the decompressor 200 may consider this a "miss" and write arbitrary placeholder data to the destination position and place the copy instruction 204 in the patch buffer 500 as previously described.

Figure 8:
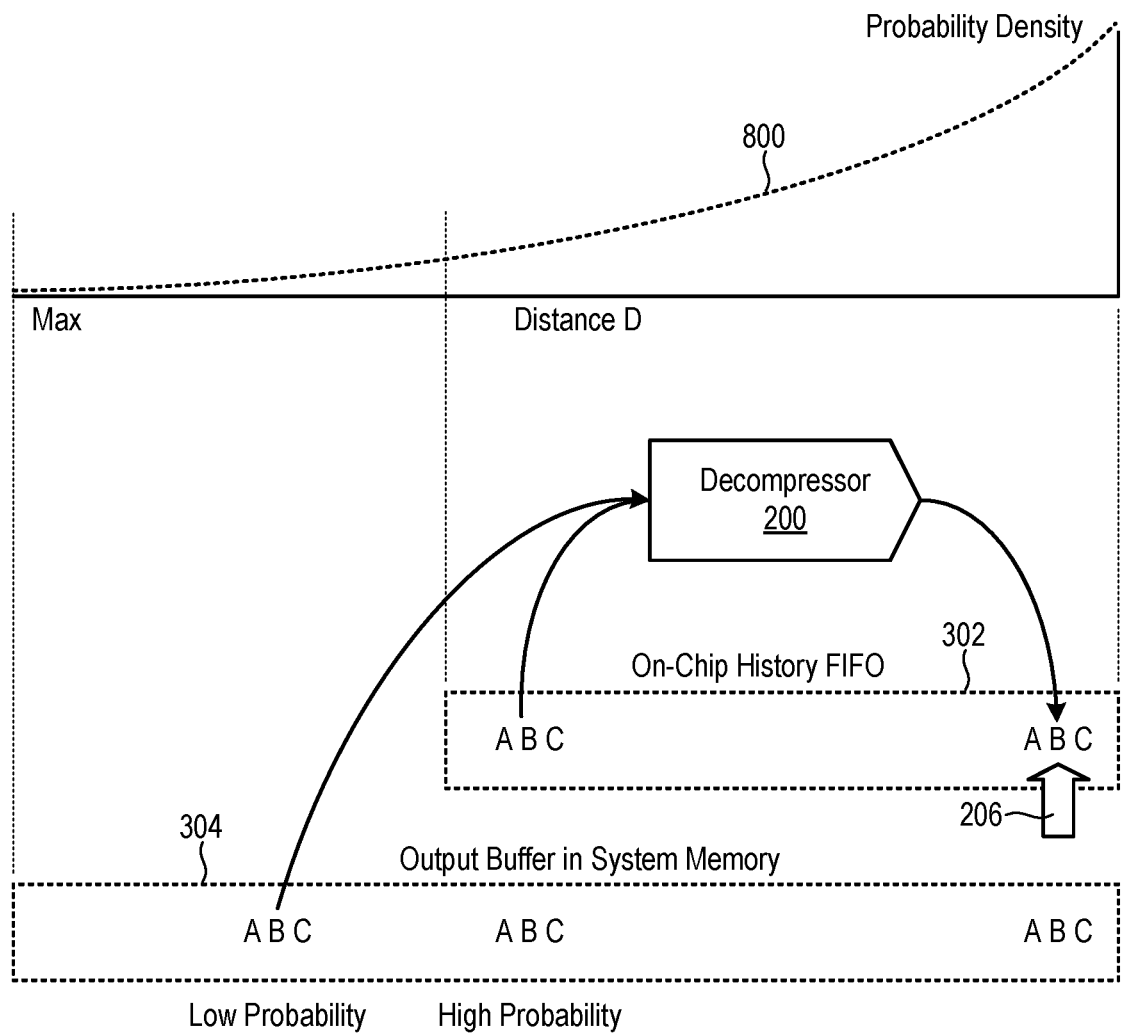
FIG. 8 is a high-level block diagram showing the probability density of finding needed data within the on-chip history buffer.

Referring to FIG. 8, although the techniques disclosed herein enable software/firmware 600 to patch "holes" in a decompressed data stream, data decompression that is performed by the software/firmware 600 is generally significantly slower and less efficient than that performed by hardware (i.e., the decompressor 200). Thus, the hardware will ideally perform as much of the decompression as possible to provide optimal decompression performance.

Advantageously, even where the on-chip history buffer 302 is insufficient to accommodate the full "sliding window" of a decompression algorithm, statistics show that most duplicate strings are found at or near the leading end of the sliding window 202 as opposed to the trailing end. Thus, even where the size of the on-chip history buffer 302 is insufficient to accommodate the entire sliding window 202, a higher concentration of duplicate strings will be found within the on-chip history buffer 302 compared to outside the on-chip history buffer 302. This is evident from the "probability density" curve 800 shown in FIG. 8, which shows the probability density decreasing as the distance D increases relative to the current output offset 206. Thus, assuming that a significant portion of a sliding window is contained in the on-chip history buffer 302, most copy instructions 204 will result in "hits" as opposed to "misses." Thus, even when implementing the techniques described herein, the decompressor 200 will still carry most of the decompression workload compared to the software/firmware 600, thereby maintaining very high decompression performance.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to handle insufficient on-chip memory capacity in decompressors, the method comprising:
   executing, by a decompressor configured to decompress data, a first instruction configured to copy data from a source position within a data stream to a destination position within the data stream;
   determining whether the source position currently resides within an on-chip buffer of the decompressor, wherein the on-chip buffer is a fast memory that allows high throughput decompression;
   in the event that the source position does not currently reside within the on-chip buffer of the decompressor, writing arbitrary placeholder data to the destination position and adding the first instruction to a patch buffer, wherein the patch buffer is a fast memory that allows high throughput decompression;
   at a later point in time, retrieving the first instruction from the patch buffer and executing the first instruction by retrieving the data from the source position and overwriting the arbitrary placeholder data at the destination position with the data;
   retrieving, by one of software and firmware external to the decompressor, a list from the first instruction from the patch buffer; and
   processing, by the one of software and firmware external to the decompressor, the list from the first instruction and a second instruction.

2. The method of claim 1, wherein the arbitrary placeholder data is all zeros.

3. The method of claim 1, wherein the second instruction is for the one of software and firmware to patch holes in a decompressed data stream while the decompressor is actively working to decompress the data stream.

4. The method of claim 1, wherein writing arbitrary placeholder data to the destination position further comprises setting flag status as at least one "empty flag" associated with the destination position.

5. The method of claim 4, further comprising:
   determining the destination position for valid data by checking for the flag status as equal to the "empty flag";
   in responsive to the flag status as being equal to the "empty flag", writing the arbitrary placeholder data to the destination position; and
   placing a second copy instruction into the patch buffer.

6. The method of claim 3, wherein processing, by the one of software and firmware external to the decompressor, the list from the first instruction and a second instruction, further comprising:
   copying data from the source position in the decompressed data stream to the destination position.

7. The method of claim 1, wherein a distance between the source position and the destination position within the data stream exceeds a size of the on-chip buffer.

8. A computer program product to handle insufficient on-chip memory capacity in decompressors, the computer program product comprising a computer-readable storage medium having computer-usable program code embodied therein, the computer-usable program code configured to perform the following when executed by at least one processor:
   execute, by a decompressor configured to decompress data, a first instruction configured to copy data from a source position within a data stream to a destination position within the data stream;
   determine whether the source position currently resides within an on-chip buffer of the decompressor, wherein the on-chip buffer is a fast memory that allows high throughput decompression;
   in the event that the source position does not currently reside within the on-chip buffer of the decompressor, write arbitrary placeholder data to the destination position and add the instruction to a patch buffer, wherein the patch buffer is a fast memory that allows high throughput decompression;
   at a later point in time, retrieve the first instruction from the patch buffer and execute the instruction by retrieving the data from the source position and overwriting the arbitrary placeholder data at the destination position with the data;
   retrieve, by one of software and firmware external to the decompressor, a list from the first instruction from the patch buffer; and
   process, by the one of software and firmware external to the decompressor, the list from the first instruction and a second instruction.

9. The computer program product of claim 8, wherein the arbitrary placeholder data is all zeros and writing arbitrary placeholder data to the destination position further comprises setting flag status as at least one "empty flag" associated with the destination position.

10. The computer program product of claim 8, wherein the second instruction is for the one of software and firmware to patch holes in a decompressed data stream while the decompressor is actively working to decompress the data stream.

11. The computer program product of claim 8, wherein writing arbitrary placeholder data to the destination position further comprises setting flag status as at least one "empty flag" associated with the destination position.

12. The computer program product of claim 11, further comprising;
  determining the destination position for valid data by checking for the flag status as equal to the "empty flag";
  in responsive to the flag status as being equal to the "empty flag", writing the arbitrary placeholder data to the destination position; and
  placing a second copy instruction into the patch buffer.

13. The computer program product of claim 9, wherein processing, by the one of software and firmware external to the decompressor, the list from the first instruction and a second instruction, further comprising:
  copying data from the source position in the decompressed data stream to the destination position.

14. The computer program product of claim 8, wherein a distance between the source position and the destination position within the data stream exceeds a size of the on-chip buffer.

15. A system to handle insufficient on-chip memory capacity in decompressors, the system comprising:
  at least one memory device operably coupled to the at least one processor and storing instructions for execution on the at least one processor, the instructions causing the at least one processor to:
    execute, by a decompressor configured to decompress data, a first instruction configured to copy data from a source position within a data stream to a destination position within the data stream;
    determine whether the source position currently resides within an on-chip buffer of the decompressor, wherein the on-chip buffer is a fast memory that allows high throughput decompression;
    in the event that the source position does not currently reside within the on-chip buffer of the decompressor, write arbitrary placeholder data to the destination position and add the instruction to a patch buffer, wherein the patch buffer is a fast memory that allows high throughput decompression;
    at a later point in time, retrieve the first instruction from the patch buffer and execute the instruction by retrieving the data from the source position and overwriting the arbitrary placeholder data at the destination position with the data;
    retrieve, by one of software and firmware external to the decompressor, a list from the first instruction from the patch buffer; and
    process, by the one of software and firmware external to the decompressor, the list from the first instruction and a second instruction.

16. The system of claim 15, wherein the arbitrary placeholder data is all zeros and writing arbitrary placeholder data to the destination position further comprises setting flag status as at least one "empty flag" associated with the destination position.

17. The system of claim 15, wherein the second instruction is for the one of software and firmware to patch holes in a decompressed data stream while the decompressor is actively working to decompress the data stream.

18. The system of claim 16, further comprising:
  determining the destination position for valid data by checking for the flag status as equal to the "empty flag";
  in responsive to the flag status as being equal to the "empty flag", writing the arbitrary placeholder data to the destination position; and
  placing a second copy instruction into the patch buffer.

19. The system of claim 17, wherein processing, by the one of software and firmware external to the decompressor, the list from the first instruction and a second instruction, further comprising:
  copying data from the source position in the decompressed data stream to the destination position.

20. The system of claim 15, wherein a distance between the source position and the destination position within the data stream exceeds a size of the on-chip buffer.

* * * * *